(12) United States Patent
Moscibroda et al.

(10) Patent No.: US 11,032,359 B2
(45) Date of Patent: *Jun. 8, 2021

(54) MULTI-PRIORITY SERVICE INSTANCE ALLOCATION WITHIN CLOUD COMPUTING PLATFORMS

(71) Applicant: MICROSOFT TECHNOLOGY LICENSING, LLC, Redmond, WA (US)

(72) Inventors: Thomas Moscibroda, Redmond, WA (US); Yang Chen, Beijing (CN); James E. Johnson, Bellevue, WA (US); Ajay Mani, Woodinville, WA (US); Mark Eugene Russinovich, Hunts Point, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/839,357

(22) Filed: Apr. 3, 2020

(65) Prior Publication Data
US 2020/0236160 A1 Jul. 23, 2020

Related U.S. Application Data

(63) Continuation of application No. 15/751,836, filed as application No. PCT/US2016/046372 on Aug. 10, 2016, now Pat. No. 10,630,765.

(30) Foreign Application Priority Data

Aug. 10, 2015 (CN) .......................... 201510486628.1

(51) Int. Cl.
*H04L 29/08* (2006.01)
*G06F 9/50* (2006.01)

(52) U.S. Cl.
CPC .......... *H04L 67/1002* (2013.01); *G06F 9/505* (2013.01); *G06F 9/5088* (2013.01)

(58) Field of Classification Search
CPC .................................................. H04L 67/1002
See application file for complete search history.

(56) References Cited

U.S. PATENT DOCUMENTS

2014/0068077 A1   3/2014   Hadad et al.

OTHER PUBLICATIONS

"Summons to Attend Oral Proceedings Issued in European Patent Application No. 16754084.8", Mailed Date: Sep. 29, 2020, 08 Pages.

*Primary Examiner* — Adnan M Mirza
(74) *Attorney, Agent, or Firm* — Shook, Hardy & Bacon

(57) ABSTRACT

In various embodiments, methods and systems for optimizing allocation of multi-priority service instances are provided. In embodiments, a quality metric associated with each candidate node to which a service instance could be allocated is determined. An eviction cost or a survival metric associated with at least a portion of the candidate nodes to which the service instance could be allocated are determined. The eviction costs generally indicate a cost to evict a service instance from a corresponding node such that another service instance can be allocated to that node. At least a portion of the quality metrics and either the eviction costs or the survival metrics are used to select a node from the candidate nodes to which to allocate the service instance.

20 Claims, 11 Drawing Sheets

MULTI-PRIORITY SERVICE INSTANCE ALLOCATION WITHIN CLOUD COMPUTING PLATFORMS

CROSS-REFERENCE TO RELATED APPLICATIONS AND PRIORITY CLAIM

This application is a continuation of co-pending U.S. patent application Ser. No. 15/751,836, which was the national stage of International Application PCT/US2016/046372 filed Aug. 10, 2016, which claims foreign priority to Foreign Application CN201510486628.1 filed Aug. 10, 2015. titled "Multi-Priority Service Instance Allocation within Cloud Computing Platforms," all of which application are hereby incorporated herein by reference in their entirety.

BACKGROUND

Large-scale networked systems are commonplace platforms employed in a variety of settings for running applications and maintaining data for business and operational functions. For instance, a data center (e.g., physical cloud computing platform) may provide a variety of services (e.g., web applications, email services, search engine services, etc.) for a plurality of customers simultaneously. These large-scale networked systems typically include a large number of resources distributed throughout the data center, in which, each resource resembles a physical machine or a virtual machine (VM) running on a physical node or host. When the data center hosts multiple tenants (e.g., customer programs), these resources can be optimally allocated to the different tenants to improve operation of the cloud computing platform.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to an efficient multi-priority service instance allocation platform in a cloud computing environment. In particular, service instances are allocated or deployed to nodes in accordance with a priority level associated with the corresponding service instance and, in some cases, the priority level(s) of service instances already deployed on a node(s). At a high level, various metrics or factors may be considered in allocating a new service instance including a packing quality metric, an eviction cost metric, and/or a survival metric. Using such metrics, near-optimal utilization can be achieved for high-priority service instances as well as low-priority service instances.

BRIEF DESCRIPTION OF THE DRAWINGS

The present invention is described in detail below with reference to the attached drawing figures, wherein.

DETAILED DESCRIPTION

Figure 1A:
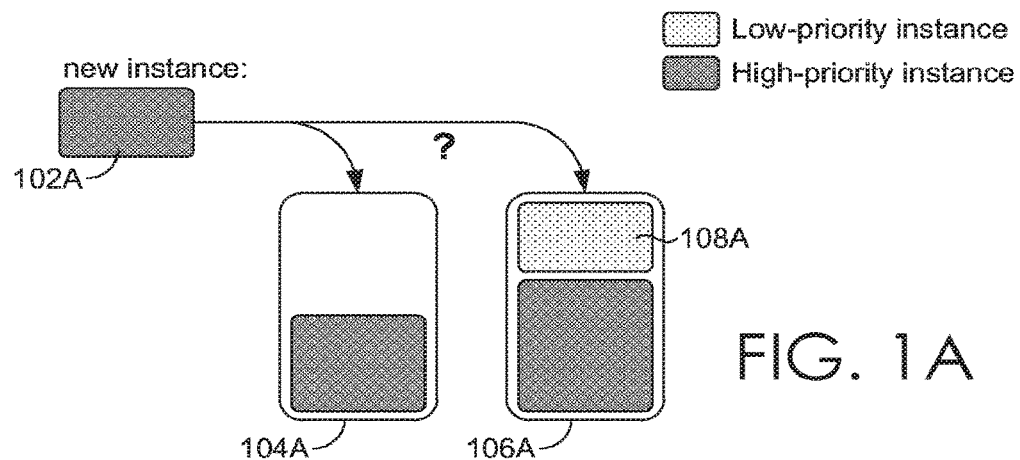
FIGS. 1A, 1B, and 1C are block diagrams of examples of balancing various metrics to allocate service instances, in accordance with embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to distributed computing devices and components of an allocation platform that supports optimal allocation of multi-priority service instances to nodes in a cloud computing environment. Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

By way of background, a cloud computing platform can provide different offerings of cloud computing services within a collection of nodes that are managed together. Offerings can refer to a combination of resources (e.g., CPU, GPU, RAM, Storage, etc.) which a tenant or user can request or select to run for their tenant infrastructure. Efficiently providing cloud computing resources to meet tenant service requests based on offerings can advantageously improve the operation of the cloud computing platform. When a data center hosts multiple tenants associated with corresponding tenant programs, applications and services, various resources can be optimally allocated to the different tenants to improve operation of the cloud computing platform.

In a cloud computing environment, service instances are generally allocated, deployed, or provisioned to nodes within the cloud infrastructure. A service instance or instance refers to a virtual machine (VM), container, other software implementation of a machine (e.g., a computer) that executes programs like a physical machine, or a process, thread, or any other piece of software. A node refers to a machine to which a service instance is deployed, such as a server or computing device. Although a node is generally referred to herein as a physical machine to which a service instance (e.g., VM) is allocated and executes thereon, embodiments of the present invention are not intended to be limited thereto. For instance, a node is also contemplated to include a virtual machine on which another virtual machine (service instance) can run or execute.

To allocate service instances, an allocation platform, which may also be referred to as a scheduler or placement component, is typically used to determine on which node(s) a particular service instance should run. An allocation platform is a significant component in a cloud infrastructure as the platform largely determines utilization and thereby cost, cost of goods sold (COGS), and reliability, among other metrics, associated with the cloud.

In conventional cloud infrastructures, an allocation platform generally operates to allocate single priority-level service instances. In this regard, allocation or deployment of a service instance is not dependent on a priority level (e.g., a high priority or low priority) associated with the service instance or request thereof. Once a single priority-level service instance is allocated or deployed to a node, the service instance is not generally removed from the node, except in limited circumstances such as host-OS updates, machine failures, or termination by the tenant.

To optimize resource utilization, multiple-priority service instances may be used. Multi-priority refers to the capability to use various or different priority levels in connection with service instance requests and/or allocation of service instances. As such, multiple priority levels may be used to designate different levels of resource prioritization. A low-priority service instance or an evictable service instance refers to a service instance associated with a low priority level such that the service instance is evictable from a particular node to which it is assigned or deployed. A service instance may be designated as low-priority for any number of reasons, for example, a low-priority service level designation may be used to reduce costs to a tenant associated with a particular service instance (i.e. a low-priority service instance). Another example of a low-priority service may include a batch job (i.e., tasks that have high flexibility in terms of when the tasks are to be run). A high-priority service instance or a non-evictable service instance refers to a service instance associated with a high priority level such that the service instance is not evictable from a particular node to which it is assigned or deployed. As such, a high-priority service instance can pre-empt or evict lower-priority service instances if necessary. In some cases, a high-priority service instance might be a default priority level assigned or associated with a service instance such that the service instance cannot be evicted to allocate resources for another service instance. Although a low and high priority service level, or evictable and non-evictable priority level, is generally described herein, any number or extent of service levels may be employed in accordance with various embodiments of the present invention. For example, various priority levels may be represented by any values, such as numerical values (e.g., 1-10).

Utilizing multiple priority levels, however, results in complexity in terms of efficiently allocating service instances to nodes, or physical resources. Generally, in a single-priority-level implementation, allocations attempt to maximize as many service instances onto a given number of nodes (e.g., physical computers) as possible (often referred to as packing efficiency or packing). With the existence of multiple priority levels, allocation of service instances becomes more challenging as maximizing packing efficiency of high-priority workloads may lead to unnecessary evictions of lower-priority workloads. On the other hand, minimizing the number (or cost) of evictions may also not be optimal as such an implementation may lead to an increase in fragmentation, a significant degradation of packing quality (i.e., fewer service instances can be run on the totality of available resources), a lower utilization, a higher failure healing rate, or the like.

As such, embodiments of the present invention are directed to an efficient multi-priority service instance allocation platform in a cloud computing environment. In particular, service instances are allocated or deployed to nodes in accordance with a priority level associated with the corresponding service instance and, in some cases, the priority level(s) of service instances already deployed on a node(s). At a high level, an allocation platform can employ algorithms that determine for each new service instance to which physical node the instance should be deployed and, if necessary, which low-priority instance should be evicted to release resources for a higher-priority service instance.

In implementations described herein, various metrics or factors may be considered in allocating a new service instance including a packing quality metric, an eviction cost metric, and/or a survival metric. Using such metrics, near-optimal utilization can be achieved for high-priority service instances as well as low-priority service instances. Packing quality or a packing quality metric generally refers to a metric, measurement, or indication of an extent to which a service instance "fits" with a node, that is, suitable in accordance with resources. High packing quality indicates that more service instances can be run on a given set of nodes, thus reducing costs. In embodiments, packing quality is based on a multi-dimensional resource heuristic based on various resource demands, such as CPU, memory, etc. A multi-dimensional best-fit can be used to determine a node that offers the best, or nearly the best, packing quality for a new service instance.

Eviction cost refers to an indication of a cost to evict a service instance from a node such that another service instance can be allocated to that node. For example, assume a high-priority service instance is to be deployed. It may be favorable, and have a minimal cost, to allocate the service instance to an empty available resource such that no currently deployed low-priority service instance needs to be suspended or evicted. Generally, allocation of a service instance in such a way as to minimize the eviction cost is preferred, that is, to minimize the cost of total instances that are evicted to accommodate a new service instance.

Survival refers to a likelihood or extent that a service instance will not be evicted, in some cases, within a time frame, or that a service instance will survive on a node, in some cases, for a time duration. For example, when deploying a low-priority instance, it is desirable to deploy the service instance onto a node where the service instance has a high probability of not being evicted shortly thereafter. Stated differently, it is desired to deploy service instances onto nodes where their expected survival time (i.e., the expected time until their eviction/suspension) is maximized. As such, service instances are desired to be deployed to nodes where they have the least negative impact on the subsequent deployment of higher-priority instances. The expected future lifetime (time until an instance is suspended) can substantially differ between nodes. For example, consider the three nodes in the Table 1 below. If a low-priority instance is deployed on the third node, it will be able to stay alive for more than thirty times longer than if it is deployed on the first node. The second node offers a ten times longer survival time than the first node.

TABLE 1

| Node | # Cores Used | Memory Used | Instance "Survival Time" if allocated to this Node |
|---|---|---|---|
| Node A | 13.42 | 38.5 | 8.1 |
| Node B | 12.2 | 35 | 83.2 |
| Node C | 6.1 | 17.5 | 264.9 |

As can be appreciated, in some cases, balancing a combination of these metrics to obtain optimal performance can be a challenge. For example, and with reference to FIG. 1A, assume that a high-priority service instance 102A is to be allocated to the first node 104A or the second node 106A. If the high-priority service instance 102A is allocated to the first node 104A, no lower-priority workload must be suspended (i.e., the eviction cost is zero). On the other hand, if the high-priority service instance 102A is allocated to the second node 106A, the packing quality is optimal (i.e., the new instance fits perfectly into the current fragmentation gap), but the low-priority service instance 108A currently on the node must be suspended leading to a non-zero eviction cost.

Figure 1B:
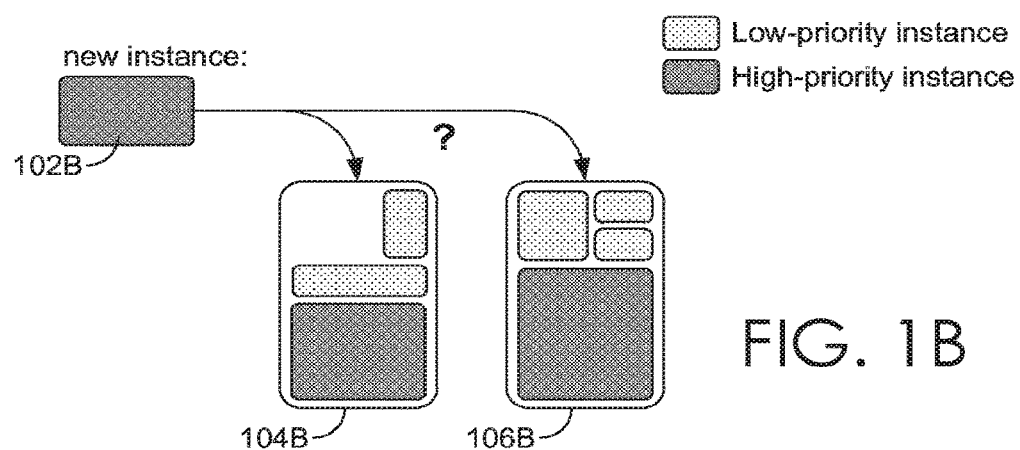

As another example, and with reference to FIG. 1B, again assume that a high-priority service instance 102B is to be allocated to the first node 104B or the second node 106B. In such a case, evictions would be necessary on both nodes. The eviction cost appears less on the first node 104B, but a stronger packing quality would result if allocated to the second node 106B. On one hand, if minimizing the eviction cost is the primary consideration and packing quality is a secondary consideration used to allocate the high-priority service instance 102B, the overall packing quality for the high-priority workload may degrade if node 104B is selected for allocation resulting in a lower utilization for the highest priority workloads. On the other hand, if packing quality is the primary consideration such that high-priority service instance 102B is deployed on node 106B, the eviction cost may increase significantly.

Figure 1C:
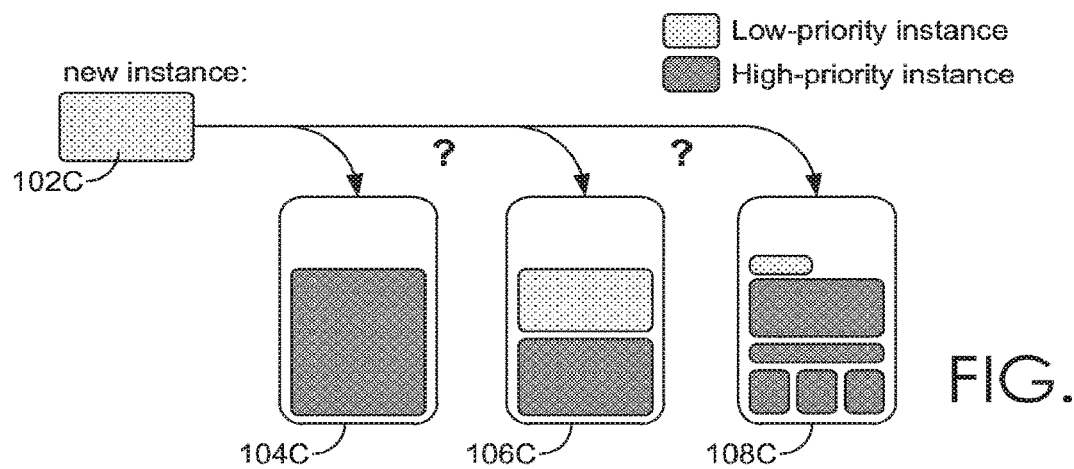

As yet another example, and with reference to FIG. 1C, assume that a low-priority instance 102C is to be allocated to a first node 104C, a second node 106C, or a third node 108C. In this case, the deployment of the instance 102C to any of the nodes generally would result in good packing. However, the selection for which to allocate the low-priority service instance 102C may impact a subsequent ability to deploy a new high-priority service instance with good packing quality.

As such, embodiments of the present invention are directed to efficient allocation of multi-priority service instances utilizing allocation metrics, such as packing quality, eviction cost, and/or survival. Utilizing such metrics can facilitate effectuating, for example, an optimal balance of a desire for high-packing quality for high-priority workloads, a desire to avoid causing unnecessary evictions, and a desire to deploy lower-priority workloads in such a way as to not cause a degradation of packing quality. In this regard, embodiments work to combine the optimization of packing quality, minimization of eviction cost, and/or maximization of survival.

Figure 2:
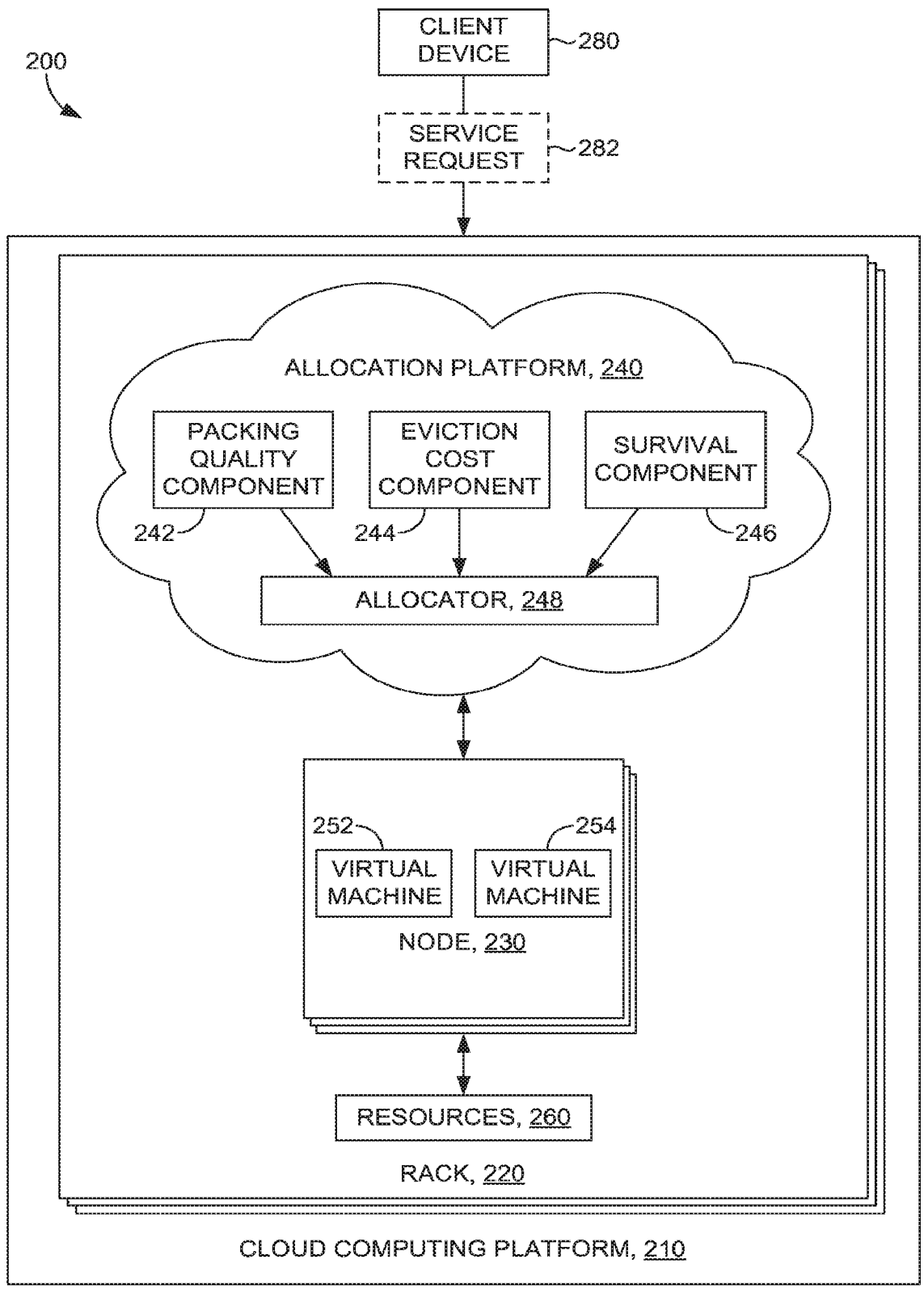
FIG. 2 is a block diagram of an exemplary operating environment in which embodiments described herein may be employed.

Turning to FIG. 2, FIG. 2 illustrates an exemplary distributed computing environment 200 in which implementations of the present disclosure may be employed. In particular, FIG. 2 illustrates an allocation system within a cloud computing environment 200. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 200 that includes the cloud computing platform 210, rack 220, node 230 (e.g., computing devices, processing units, or blades), and allocation platform 240 in rack 220. The allocation system can be implemented with a cloud computing platform 210 that runs cloud services across different data centers and geographic regions. The cloud computing platform 210 can implement allocation platform 240 for provisioning and managing resource allocation, deployment, upgrade, and/or management of cloud services. Typically, the cloud computing platform 210 acts to store data or runs service applications in a distributed manner. The cloud computing platform 210 in a data center can be configured to host and support operation of endpoints of a particular service application. The cloud computing platform 210 may be a public cloud, a private cloud, a hybrid cloud, or a dedicated cloud.

The allocation platform 240 generally provisions or allocates resources for a service instance to a node, such as node 230. Node 230 may be configured to perform specialized functionality (e.g., compute nodes or storage nodes) within the cloud computing platform 210. The node 230 is allocated to run one or more portions of a service application of a tenant. A tenant can refer to a customer utilizing resources of the cloud computing platform 210. Service application components of the cloud computing platform 210 that support a particular tenant can be referred to as a tenant infrastructure or tenancy. The terms service application, application, or service are used interchangeably herein and broadly refer to any software, or portions of software, that run on top of, or access storage and compute device locations within, a data center.

When more than one service application is being supported by the node 230, the node may be partitioned into virtual machines (e.g., virtual machine 252 and virtual machine 254) and/or containers. Physical machines can also concurrently run separate service applications. The virtual machines or physical machines can be configured as individualized computing environments that are supported by resources 260 (e.g., hardware resources and software resources) in the cloud computing platform 210. It is contemplated that resources can be configured for specific service applications. Further, each service application may be divided into functional portions such that each functional portion is able to run on a separate virtual machine. In the cloud computing platform 210, multiple servers may be used to run service applications and perform data storage operations in a cluster. In particular, the servers may perform data operations independently but exposed as a single device referred to as a cluster. Each server in the cluster can be implemented as a node.

In operation, and at a high level, a client device 280 can be configured to generate and communicate a service request. Client device 280 may be linked to a service application in the cloud computing platform 210. The client device 280 may be any type of computing device, which may correspond to computing device 1100 described with reference to FIG. 11, for example. The client device 280 can be configured to issue commands to cloud computing platform 210. In embodiments, client device 280 may communicate with service applications through a virtual Internet Protocol (IP) and load balancer or other means that directs communication requests to designated endpoints in the cloud computing platform 210. The components of cloud computing platform 210 may communicate with each other over a network (not shown), which may include, without limitation, one or more local area networks (LANs) and/or wide area networks (WANs).

The service request can be communicated as a service request 282. As can be appreciated, the service request 282 may include or be associated with any type of information. For instance, the service request 282 may include or be associated with service instance preferences, constraints, or resource requirements, such as CPU cores, main memory, network bandwidth, hard disks, etc. In some embodiments, the service request 282 may also indicate a priority level for a corresponding service instance.

The allocation platform 240 generally receives an indication to allocate a service instance associated with the service request to a node. For instance, the allocation platform 240 can receive the service request 282 indicating deployment of a service instance associated therewith. In some cases, the allocation platform 240 may receive the service request itself. In other cases, the allocation platform 240 may receive instructions to allocate a service instance based on the service request, such as service request 282. For instance, although not illustrated, in some cases, one or more levels of processing may occur prior to the allocation platform 240 allocating a service instance in association with a service request. By way of example only, in some cases, an API that is a front end through which requests pass through, such as RDFE (RedDog Front End), may receive a service request that then queries various allocator platforms associated with different clusters. Upon selecting a particular allocation platform or cluster, an instruction can then be provided thereto to deploy a service instance.

Upon receiving an indication to allocate a service instance, the allocation platform 240 can utilize parameters (e.g., resource requirements) corresponding with a service request to allocate or deploy a service instance onto a node. In this regard, the allocation platform 240 allocates resources of a node as a service instance (e.g., virtual machine or container). As described in more detail below, the allocation platform 240 may use various metrics to produce close-to-optimal placement decisions for requested resources. Such metrics may include, for example, packing quality, eviction cost, and/or survival.

The allocation platform 240 may recognize the service level associated with the service instance to be deployed. In some cases, the service request, such as service request 282, may indicate the service level (e.g., high or low priority level). In other cases, the service level may be accessed, referenced, or looked up, for example, based on data provided in the service request. For instance, upon receiving a service request for deployment of a service instance, a priority level may be looked up to apply in association with the service level (e.g., based on a previous designation by a tenant). In some cases, a service level associated with a service instance may be used to select a node to which to deploy the service instance.

As shown, the allocation platform 240 includes various components to allocate service instances to nodes, as illustrated by the packing quality component 242, the eviction cost component 244, the survival component 246, and the allocator 248. At a high level, the packing quality component 242 is configured to determine a packing quality metric(s), the eviction cost component 244 is configured to determine an eviction cost metric(s), and the survival component 246 is configured to determine a survival metric(s). The various metrics can then be used by the allocator 248 to determine an allocation or deployment for a service instance to a node. Each of these components is described in more detail below.

Although FIG. 2 illustrates four separate components to allocate service instances, it can be appreciated that the functionality described herein with respect to these components can be provided in any number of components, such as a single component. In some implementations, functionality described in association with one or more of the components may be omitted. For example, although some embodiments described herein refer to utilization of the packing quality, eviction cost, and survival metrics, in some implementations, a subset of the metrics may be used (e.g., packing quality and eviction costs) to allocate service instances. In such cases, the functionality of the desired components only need implemented. Further, a component (not illustrated) can function as a proxy for considerations the allocator, for example, allocator 248 might take into account. For instance, the allocator might spread instances across multiple racks to optimize availability (availability maximization component), perform load balancing (load-balancing component), or optimize co-location requirements (co-location component).

The packing quality component 242 is configured to determine a metric(s) indicating packing quality in association with a service instance to be allocated. Packing quality or a packing quality metric generally refers to a metric, measurement, or indication of an extent to which a service instance "fits" with a node. In embodiments, packing quality is based on a multi-dimensional resource heuristic based on various resource demands, such as CPU, memory, etc. A multi-dimensional best-fit can be used to determine a node that offers the best packing quality for a new service instance. A packing quality metric can be represented in any number of manners. For example, a packing quality metric might be a value (e.g., numerical value) that indicates an extent or degree to which service instance fits a node, an indication of a preferred node or set of nodes to use, an indication of an undesired node or set of nodes for which to allocate, or another indication that provides a metric or comparison between nodes (e.g., node A is better).

A packing quality metric can be generated in any number of ways, and a method used to determine a packing quality metric is not intended to be limited in any manner. As one example for determining a packing quality metric, different resources can be weighed according to their scarcity. For example, in cases that service instances are mostly high-memory instances, memory availability might be the main bottleneck, and therefore the memory resource dimension will be more highly valued when deciding on the packing. A determination of packing quality can be extended to any number of resource dimensions. In some embodiments, determining packing quality ignores lower priority instances when calculating a node's packing score for an instance. For example, this means that the packing score for a service instance to be allocated does not take into account the evictable, or low-priority, instances on a node into account.

One example of a multidimensional best-fit packing algorithm used to compute a score for each candidate node is provided in equation 1 below:

$$\text{Score} = \Sigma_d w_d * r_d \quad \text{Equation 1}$$

wherein d represents the resources (e.g., CPU, memory, SSD, etc.), $r_d$ is the remaining resource d (e.g., as percentage) on the node after packing the current instance, and $w_d$ is a weight assigned to resource d. The weight for each resource may be the cluster-wide utilization of that resource, which reflects the value of that resource. For example, the weight for the CPU resource is the number of total allocated cores across all nodes divided by the total healthy core in the cluster. Implementation of such an algorithm might be used to avoid use of empty nodes; attempt to pack some nodes to full or near-full state, in which no more or few instances can be packed; push full states with high waste to full states with low waste, etc.

The packing quality component 242 can output packing quality metrics to the allocator 248 in any format. In this manner, as can be appreciated, a metric(s) output from the packing quality component may be a score(s) (e.g., the smallest score indicating better packing), or an indication of the node(s) having a smallest score(s). For example, in some cases, a packing quality score can be generated for each candidate node and each such score can be provided to the allocator 248 for use in allocating a service instance. In another example, upon generating a packing quality score for each candidate node, the node(s) with the smallest score (or within a threshold value from one another) can be selected and provided to the allocator 248 for use in allocating a service instance. As previously described, a packing quality metric can be represented in any number of manners, such as a value (e.g., numerical value) that indicates an extent or degree to which service instance fits a node, an indication of a preferred node or set of nodes to use, an indication of an undesired node or set of nodes for which to allocate, or another indication that provides a metric or comparison between nodes (e.g., node A is better). A specific manner or format for providing a packing quality metric to allocator 248 may depend on the allocation algorithm used by the allocator 248, some of which are described in more detail below.

The eviction cost component 244 is configured to determine eviction cost metrics. An eviction cost metric refers to an indication of a cost to evict a service instance from a node such that another service instance can be allocated to that node. An eviction cost metric can be represented in any number for ways, such as, for instance, a value or quantity associated with a cost or an indication of an eviction cost comparison (e.g., a preference for a particular node or set of nodes with a least eviction cost). For example, assume a high-priority service instance is to be deployed on node A or node B. The eviction cost component 244 can determine an eviction cost associated with allocating the service instance to node A and an eviction cost associated with allocating the service node to node B. In some implementations, an eviction cost metric might be an eviction cost(s) associated with a candidate node (e.g., node A, node B). In other implementations, an eviction cost metric might be a preference for node A or node B, for example, based on calculated eviction costs.

Determination of an eviction cost metric(s) might occur in any number of ways. For instance, an eviction cost metric may be based on a count of the number of allocated service instances (e.g., VMs) that would be evicted should a current service instance be placed at a particular node. By way of example only, assume node A already has three service instances running on the node. In such a case, an eviction cost metric associated with node A may be a cost of three as three service instances already running on node A would be evicted if a new service instance is deployed on node A. Another method for determining an eviction cost metric might be based on priority levels. In such a case, an assumption may be made that a higher priority service instance has more cost (e.g., infinitely more cost) than a lower-priority service instance. As such, if selecting between evicting ten virtual machines of a lower priority level on node A or one virtual machine of a higher priority level on node B, an eviction cost metric might indicate in some manner a preference to allocate to node B and/or to evict the ten virtual machines of lower priority on node A. As can be appreciated, an eviction cost may be zero in cases that no service instances are evicted.

Another method for determining an eviction cost metric might be based on an impact of a service associated with an instance(s) being evicted, such as the case in which an entire service needs to be evicted. For example, assume there are two services A and B, but having 10 service instances to be deployed. Further assume that service A can flexibly scale up/down (e.g., if one of its instances is evicted, the service will continue running with 9 instances), and that service B has a lower-bound limit of 10 services (e.g., if one of its service instances is evicted, then the entire service needs to be evicted). In such a case, given the choice of evicting an instance from service A or service B, evicting an instance from service A is likely to be chosen. Yet, another method for determining an eviction cost might be to use the running-time of a service to determine its eviction cost, or any other external factor.

The eviction cost component 244 can output eviction cost metrics to the allocator 248 in any format. In this manner, as can be appreciated, a metric(s) output from the eviction cost component may be a cost(s) or score(s) (e.g., the smallest score), or an indication of the node(s) having a particular cost(s) or score(s) (e.g., smallest score(s)). For example, in some cases, an eviction cost can be generated for each candidate node and each such cost can be provided to the allocator 248. In another example, upon generating an eviction cost for each candidate node, the node(s) with the smallest cost (or within a threshold value from one another) can be selected and provided to the allocator 248 for use in allocating a service instance. As previously described, an eviction cost metric can be represented in any number of manners, such as a value (e.g., numerical value) that indicates a cost to evict a service instance from a node such that another service instance can be allocated to that node, an indication of a preferred node or set of nodes to use, an indication of an undesired node or set of nodes for which to allocate, or another indication that provides a metric or comparison between nodes (e.g., node A is better). A specific manner or format for providing a packing quality metric to allocator 248 may depend on a particular allocation algorithm used by the allocator 248, some of which are described in more detail below.

The survival component 246 is configured to determine survival metrics. Survival refers to a likelihood or extent that a service instance will not be evicted, in some cases, within a time frame, or that a service instance will survive on a node, in some cases, for a time duration. In this way, a survival metric provides an indication of a prediction of how long a service instance (e.g., VM) will survive if deployed to a node (e.g., server). Generally, when deploying a low-priority service instance, it is desirable to deploy the service instance onto a node where the service instance has a high probability of not being evicted shortly thereafter. That is, it is desired to deploy service instances onto nodes where their expected survival time (i.e., the expected time until their eviction/suspension) is maximized. Service instances are desired to be deployed to nodes where they have the least negative impact on the subsequent deployment of higher-priority instances. The expected future lifetime (time until an instance is suspended) can substantially differ between nodes. As can be appreciated, a survival metric can be used to allocate a high-priority level service instance and/or a low-priority level service.

A survival metric can be represented in any number of manners. For example, a survival metric might be a numerical value that indicates a likelihood or extent that a service instance will not be evicted, in some cases, within a time frame; an extent that a service instance will survive on a node (without being evicted); an indication of a preferred node or set of nodes to use; an indication of an undesired node or set of nodes for which to allocate, or another indication that provides a metric or comparison between nodes (e.g., node A is better). By way of example only, for each service instance and node pair, a survival prediction can be made. The survival prediction might be numerical (e.g., 15 days), or a relative value (e.g., a service instance on server 1 will survive longer than on server 2).

As another example, a survival metric can be represented by a survival score that indicates or estimates an expected lifetime of a service instance on a node. In some implementations, a node has a high survival score if the probability of a service instance being ejected from a particular node in the near future is low. On the other hand, a node generally has a low survival score if the probability of the service instance being evicted from the node in the near future is high.

One implementation for determining a survival score and, as such, a survival metric, is provided herein. Generally, a survival score for a candidate node is determined as the inverse of a danger probability for the node. A danger probability refers to an estimation of how likely it is that within a next time interval, an allocation of a new instance to a candidate node v will result in some type of instance eviction. As such, a value for node v of the danger-probability(v) can be identified and used to determine a survival score (v) of this node v. As described in more detail below, an allocator may desire to allot a new instance to a node with high survival score in an effort to ensure prevention of an eviction for a long time.

In some cases, assumptions may be made that allow efficient computation of a danger-probability (v). For example, one assumption is that during a next time interval, no service instance currently deployed in a cluster is going to leave. That is, it is assumed that a current static cluster snapshot is to remain stable for the next time period when computing the danger-probability. Another assumption that can facilitate efficient computation is that each instance-type is considered independently first, and thereafter summed up over all instance-types with a union-bound. Such an assumption disregards complex inter-dependencies between instances of different types, but enables an efficient approximation of the danger-probability.

In embodiments, and at a high level, a survival score can be generated by first computing a danger-probability (v,t) for each node v and for each instance type t. An instance type may be any type of service instance. For example, an instance type might be related to size, resource, configurations, etc. associated with a service instance. By way of example only, and without limitation, a first instance type may include 1 core, 0.75 GB of RAM, and 20 GB disk sizes; a second instance type may include 1 core, 1.75 GB of RAM, and 40 GB disk sizes; a third instance type may include 2 core, 3.5 GB of RAM, and 60 GB disk sizes; a fourth instance type may include 4 core, 7 GB of RAM, and 120 GB disk sizes.

The danger-probability (v,t) represents the likelihood that within a next time interval, if a new instance is deployed to node v, and if only new service instances of type t arrive, then the deployment of the new instance on node v will cause the eviction of some already deployed service instance. In accordance with computing danger-probability (v,t) for each node v and each instance type t, the danger-probability (v) of a node v can be determined by summing up the danger-probability (v,t) over all types, thereby essentially employing a union-bound argument. Thereafter, the survival score (v) of a node v is the inverse of the danger-probability (v). A high survival score (v) may generally imply that for a long time duration, the deployment of the new instance to node v is unlikely to result in any evictions.

In some implementations, an arrival rate for each instance type is used to generate a survival score. In this regard, statistical information of the arrival rate of each instance type can be used to compute (e.g., for a suitable time duration) how many instances of each instance type will arrive within a given interval in expectation. For each node v, and each instance type t, a safety-distance (v,t) is computed in accordance with an arrival rate. Safety distance (v,t) generally refers to the expected duration of time until some instance will be evicted due to subsequent deployments of instances of type t, if the new instance is deployed on node v. Stated differently, for each node, an expected duration of time is computed indicating a new service instance can remain safe on the node v assuming new instances of type t will arrive over the next time interval. In some such calculations, assumptions may be made that no service instance leaves, that the higher-priority service instances are allocated by a multi-dimensional packing rule, and that ties are broken to avoid evicting low-priority instances if possible. In some cases, the value of safety-distance (v,t) can be computed efficiently as the nodes are sorted according to a multi-dimensional packing rule and, thereafter, a value of the safety-distance (v,t) is calculated for the nodes.

For each node v, and each instance type t, the danger-probability (v,t) is computed as the inverse of the safety-distance (v,t) (i.e., 1/safety-distance (v,t)). As previously described, the danger-probability (v,t) refers to the probability that some instance will be evicted due to subsequent deployments of instances of type t, if the new instance is deployed on node v. In this regard, assuming that instances arrive randomly in an exponential distribution, the values 1/safety-distance (v,t) can be interpreted as a probability that within some subsequent time-interval, the deployment of the new instance to node v does not cause any evictions.

The danger-probabilities (v,t) associated with the various instance types can be used to compute the danger-probability (v), for instance, using summation. For example, danger-probability (v)=$\Sigma_t$ (danger-probability(v,t)). In this manner, the different types t are aggregated into a single danger-probability(v) for each node by summing up over the different types via a union-bound approximation. Upon determining the danger-probability for a node v, the survival score can be computed using, for example, the survival score (v)=1/danger-probability(v).

Figure 3:
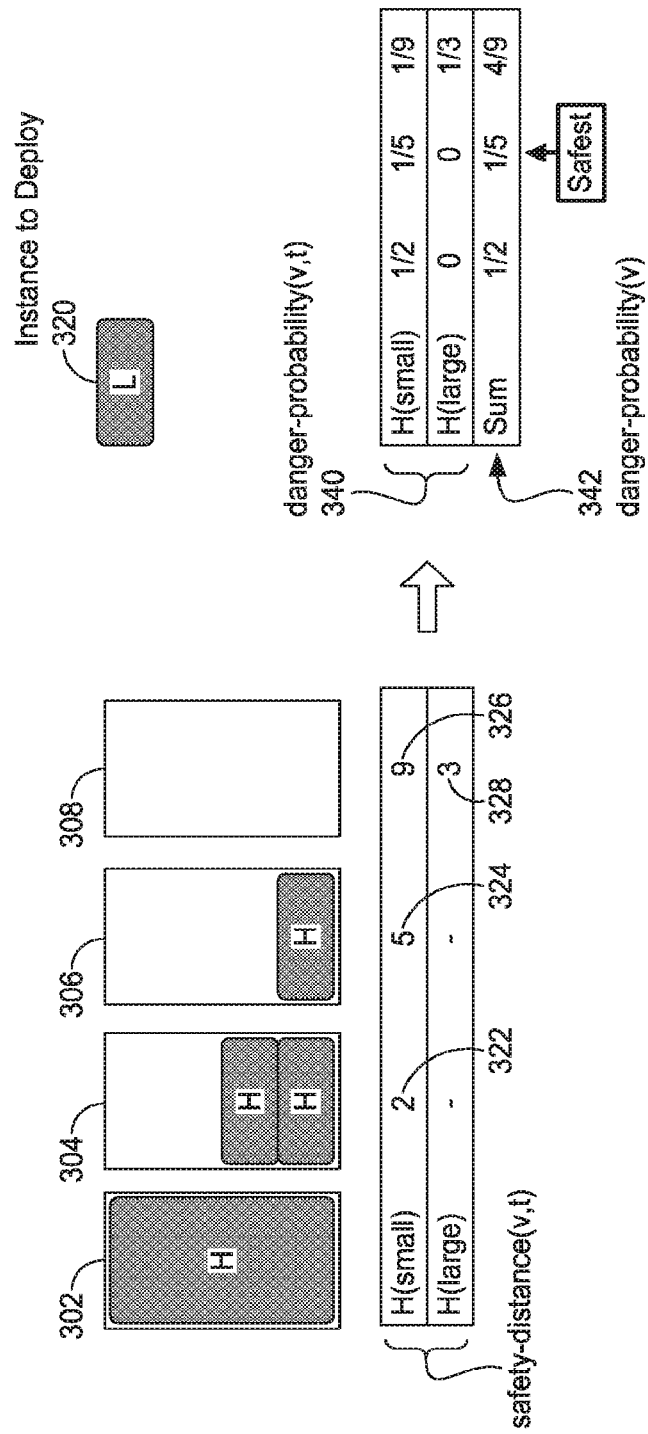
FIG. 3 is an illustrative example pertaining to determining survival metrics, in accordance with embodiments described herein.

As a specific example, and with reference to FIG. 3, assume that there are only two instance types (small, large). As shown in FIG. 3, the cluster includes four nodes, node 302, node 304, node 306, and node 308. Node 302 is full, and node 308 is entirely empty. As illustrated, only high-priority instances are currently deployed in the cluster. Assume that a new small instance 320 of low-priority is to be deployed. To compute the survival score for each node for this new instance 320, the expected arrival rate of the instances is computed. In this example, in a given time interval, assume the arrival rates of large instance types equals 1 and small instance types equals 3, that is, there are three times more small instances arriving over a certain period of time than large ones. The inverse of the arrival rates are used to compute the expected arrival intervals. In this example, the expected arrival intervals are a large instance type equals three and a small instance type equals one.

Upon obtaining the arrival intervals, a safety-distance (v,t) is computed for each node and each instance type. Specifically, a safety-distance (v,t) is computed as (the number of instances of type t necessary until some eviction happens) *(arrival interval of type t). With specific reference to node 304, the safety-distance (node 304, small instance type) for node 304 and for a small instance type can be computed. Assume a new instance is deployed on node 304. If two more small instances arrive at node 304, there will be some instance eviction. Thus, the safety-distance (node 302, small instance type) for node 304 is two times the arrival interval of small instances (i.e., 1), thus 2*1=2, as indicated at 322 in FIG. 3.

Now, consider node 306 in FIG. 3. Assume that given a multi-dimensional packing allocation rule, any new small instance will be first put onto the node 304 because the packing is optimal. Upon filling node 304, the multi-dimensional packing allocation rule will allocate a small instance(s) onto node 306. If a new instance is allocated to node 306, five new small instances are required until there is an eviction. Thus, the safety-distance (node 306, small instance type) for node 306 is five times the arrival interval of small instances (i.e., 1), thus, 5*1=5, as indicated at 324 in FIG. 3. Similarly, for node 308, the safety-distance (node 308, small instance type) is nine, because the new small instances first have to fill up in its entirety node 304, node 306, and node 308 before an eviction occurs. As such, the safety-distance (node 308, small instance type) for node 308 is nine times the arrival interval of small instance types (i.e., 1), thus, 9*1=9, as indicated at 326 in FIG. 3.

Continuing this example with respect to the large instance types, t=large, a large instance type can only be deployed to node 308. Upon a single instance being deployed on node 308 deployed, there is an eviction on this node. As such, the number of large instances needed to cause an eviction is 1 and, as previously discussed, the arrival interval of large instance types is three. Accordingly, the safety-distance (node 308, large instance type) for node 308 is one times the arrival instance of large instance types (i.e., 1*3=3), as indicated at 328.

The various safety-distances (v,t) can be converted as times, and thus, interpreted as the inverse as danger-probabilities (v,t). The danger-probabilities (v,t) 340 in FIG. 3 represent probabilities that within the next time interval, some instance will be evicted from node v, if the new instance is allocated onto node v, and subsequently instances of type t arrive in accordance with an expected arrival rate.

Upon identifying the danger-probabilities for a node associated with each instance type (i.e., danger probabilities (v,t) 340), the probabilities over all types t for each node can be summed to compute danger-probability (v) 342, which is the the inverse of the survival score (v). Generally, the node with lowest danger-probability (v) is the safest node to which to allocate the new instance. As such, in this example, node 306 is identified as the safest node to which to allocate the new instance with regard to the safety metric. To illustrate the effectiveness, assume that the new instance 320 is allocated to node 304, in such a case, there is a high probability that the new instance will be evicted due to subsequently deployed small high-priority instances that would be deployed to node 304 first. On the other hand, as soon a high-priority large instance arrives, it would likely be deployed to node 308, thus evicting any low-priority instance therefrom. As such, the non-selected nodes, that is, nodes 302, 304, and 308 are not as safe relative to the selected node 306.

Figure 4:
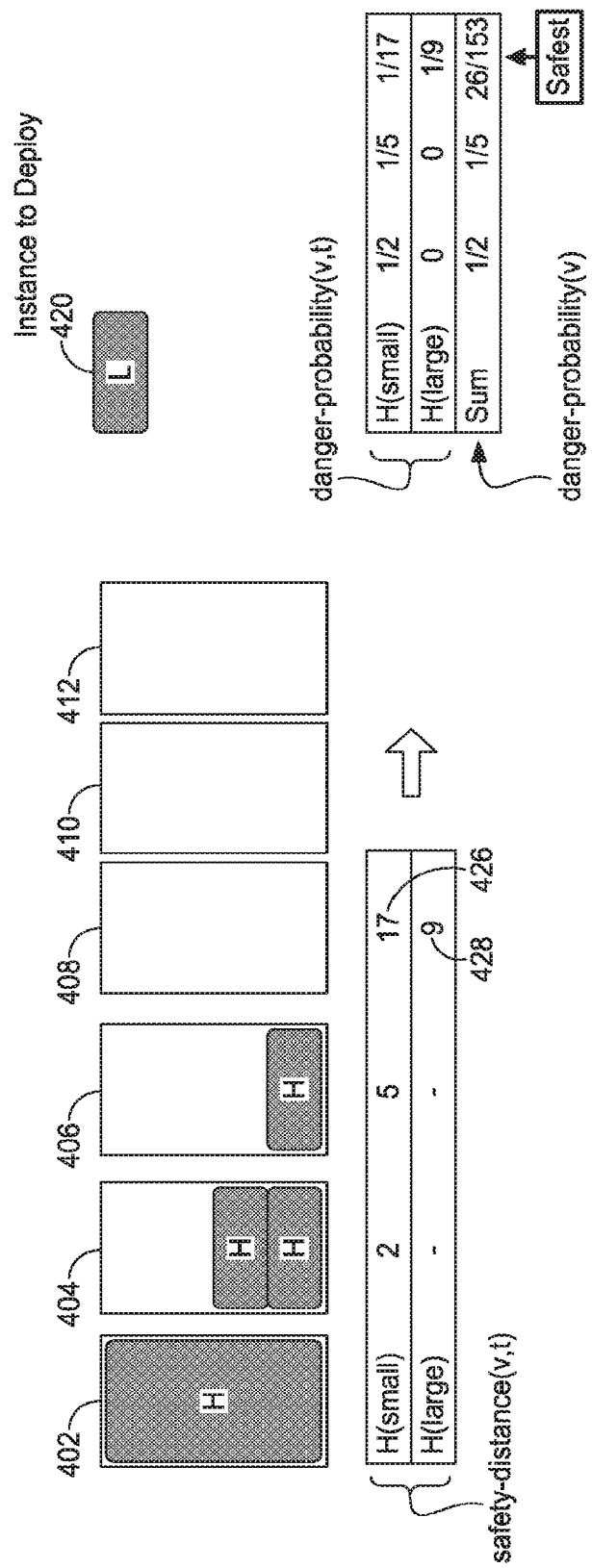
FIG. 4 is another illustrative example pertaining to determining survival metrics, in accordance with embodiments described herein.

In some implementations, the survival component 246 can automatically adapt to a specific cluster state, without manual intervention, to generate a survival metric(s). By way of example, and with reference to FIG. 4, FIG. 4 includes nodes 402, 404, 406, 408, 410, and 412. Nodes 402-408 are generally the same as nodes 302-308 in FIG. 3. As such, nodes 410 and 412 are added to the cluster, both of which are empty nodes. The survival component 246 can automatically re-evaluate the safety of node 408, as represented by safety-distance (node 408, small instance type) 426 and safety-distance (node 408, large instance type) 428. Such a re-evaluation can be triggered for any number of reasons, such as upon a time lapse, upon sufficient change in the cluster state, upon each change in the cluster, etc.

To identify a safest node for a new low priority instance 420, an estimate is made as to how likely the new low priority instance 420, if deployed onto a node such as node 408, is likely to be evicted by future high priority instances.

By way of example, and with reference to the new low priority instance 420 being potentially deployed to node 408, assume that a multi-dimensional packing quality would not allocate a new (future) large high-priority instance onto node 408. Instead, the new instance would be deployed on one of the large nodes, thus avoiding evicting out the low-priority instance. Thus, it would take three large high-priority instances to evict a newly deployed low-priority instance 420. Assume that the arrival interval of large instances is three. As such, the safety-distance (node 408, large) is now 3*3=9 as indicated at 428. Because danger-probability (node 408, large) is now ⅑ (instead of ⅓), the overall danger-probability (node 408) of node 408 is much smaller than in the example provided in association with FIG. 3. That is, the addition of many empty nodes has significantly increased the safety of node 408. A similar computation can be performed for new (future) small high-priority instances onto the node, that is, if all the future high priority instances are small instances, after allocating how many high priority instances will the new low priority instance 420 be evicted if deployed to a node, such as node 408. Upon computation of the danger-probabilities for the nodes, node 408 can be identified as the safest node. As described, the algorithm has automatically adapted to the change in the cluster state by re-evaluating the safety-scores accordingly.

Figure 5:
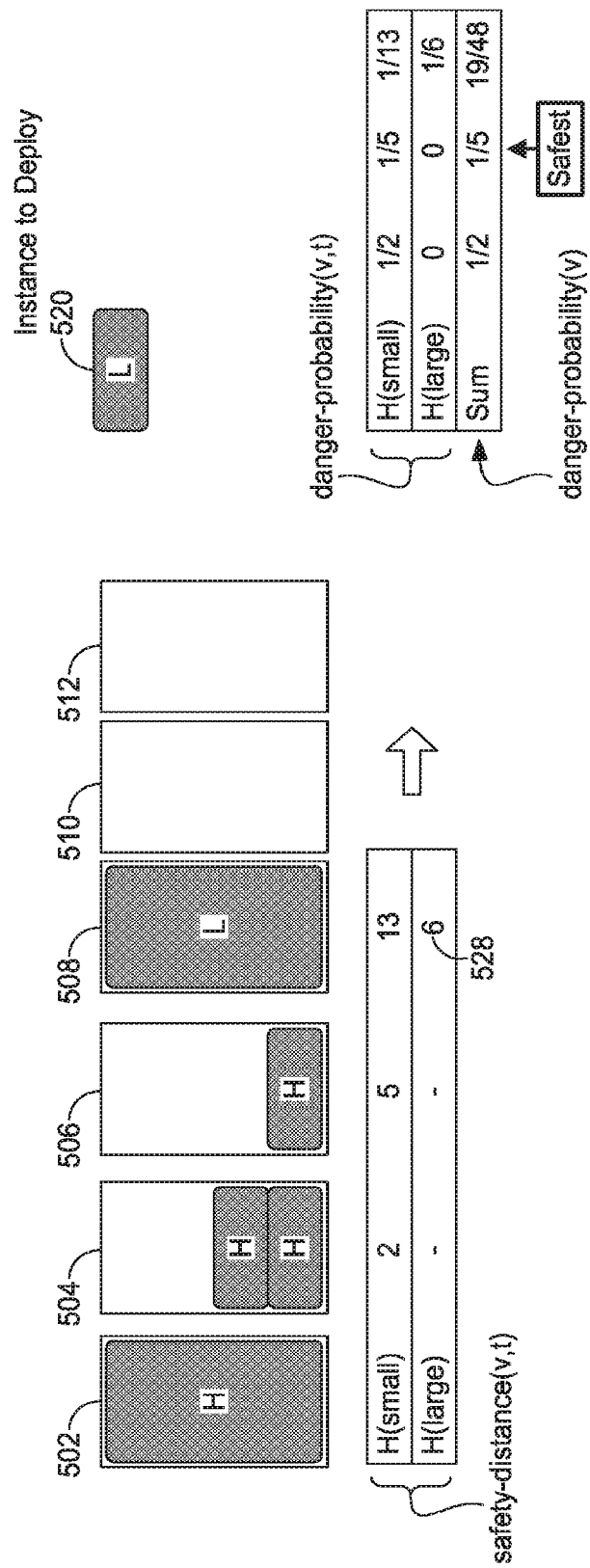
FIG. 5 is another illustrative example pertaining to determining survival metrics, in accordance with embodiments described herein.

In some cases, the survival component 246 can incorporate awareness of existing low-priority instances currently deployed in a cluster in generating a survival metric(s). By way of example, and with reference to FIG. 5, FIG. 5 includes nodes 502, 504, 506, 508, 510, and 512. In comparison with FIG. 4, node 508 is now fully used with a large priority instance. As such, in comparison with FIG. 4, there is one fewer empty "buffer node" into which large high-priority instances can be deployed without eviction. As a result, safety-distance (node 508, large instance type) 528 is reduced from 9 (in FIG. 4) to 6 (in FIG. 5). As such, the danger-probability of node 508 is increased (and nodes 510 and 512 having a same node state (empty state) are similarity increased), which renders the node 506 the safest node. As can be appreciated, a danger-probability may not be calculated for each node, but rather each node state. A node state can be designated by an extent or resources consumed by instances (e.g., high priority instances). For instance, in FIG. 5, node 502 can represent a full state, node 504 can represent a half-full state, node 506 can represent a quarter-full state, and nodes 508, 510, and 512 can represent an empty state.

Continuing with FIG. 2, the survival component 246 can output survival metrics to the allocator 248 in any format. In this manner, as can be appreciated, a metric(s) output from the survival component may be a danger-probability(s) (e.g., a lowest probability) or a survival score(s) (e.g., the largest score), or an indication of the node(s) having a particular probability(s) or score(s). For example, in some cases, a survival score can be generated for each candidate node and each such score can be provided to the allocator 248. In another example, upon generating a survival score for each candidate node, the node(s) with the largest score (or within a threshold value from one another) can be selected and provided to the allocator 248. As previously described, a survival metric can be represented in any number of manners, such as a numerical value that indicates a likelihood or extent that a service instance will not be evicted, in some cases, within a time frame; an extent that a service instance will survive on a node (without being evicted); an indication of a preferred node or set of nodes to use; an indication of an undesired node or set of nodes for which to allocate, or another indication that provides a metric or comparison between nodes (e.g., node A is better). A specific manner or format for providing a packing quality metric to allocator 248 may depend on the allocation algorithm used by the allocator 248, some methods of which are described below.

The allocator 248 is generally configured to allocate service instances (e.g., VMs) to nodes. In embodiments, the allocator 248 can access one or more metrics, such as packing quality metric, eviction cost metric, and/or survival metric, to select a node to which to allocate a particular service instance. In some cases, the allocator 248 may assess each of the metrics in layers, or subsequent to one another. In this regard, for a service instance, a first metric may be assessed to reduce the potential candidate nodes, a second metric may then be assessed to further reduce the candidate nodes, and a third metric can then be assessed to further reduce the candidate nodes. The order for assessing the metrics may occur in any manner. In other cases, the allocator 248 may assess each of the metrics simultaneously, for example, using an algorithm that includes weights for each of the metrics.

By way of example, in one embodiment, candidate nodes associated with a packing quality that exceeds (or fails to exceed) a threshold or ranking can be selected from among the entirety of candidate nodes. Utilizing packing quality awareness ensures that nodes allowing for reasonably efficient packing are considered, that is, a reasonably high packing score. For example, all candidate nodes having a greatest packing quality might be selected. As another example, candidate nodes exceeding a packing quality threshold may be selected. In this regard, in some cases, the allocator 248 might receive packing scores for each candidate node (e.g., multi-dimensional best-fit packing score), sort the candidate nodes by increasing packing score (e.g., smaller score equals better packing), and select the top X % of the sorted nodes. In other cases, the allocator 248 might receive the top X % of nodes (or other packing quality metric indicating a node(s) selection) from the packing quality component and, thereafter, use the data to allocate a service instance.

Continuing with this example, upon reducing the candidate nodes based on packing quality, eviction costs associated with the remaining candidate nodes can be used to filter out candidate nodes with a poor eviction cost (e.g., those having a high eviction cost) or to select nodes with a least eviction cost. As with the packing quality metric, candidate nodes that exceed a threshold or attain a ranking (e.g., best or top X %) can be selected from the reduced set of candidate nodes. This aspect of the analysis ensures awareness of eviction-cost. In this manner, nodes where the eviction cost is 0, or as low as possible over other nodes, can be prioritized.

Upon reducing candidate nodes based on eviction cost, the reduced set of candidate nodes may then be evaluated based on the survival metric. This survival awareness can ensure allocation to nodes where the newly-deployed instance is unlikely to be evicted by subsequently arriving higher-priority instances. In some cases, a candidate node that is likely to survive the longest or a set of candidate nodes likely to survive, for example, beyond a threshold, can be selected. As can be appreciated, in some cases, multiple candidate nodes may still exist (e.g., multiple candidate nodes have equal survival scores). In such cases, any number of rules may be applied to select a particular node. For instance, the candidate node with the greatest packing quality score may be selected.

Although one embodiment is described as utilizing each of the three metrics to identify or determine a candidate node to which to allocate a service instance, as can be appreciated, any number of metrics and/or order may be applied. For instance, in some cases, only the packing quality and eviction cost, in any order, may be used to select a candidate node. Use of only the packing quality and eviction cost may be implemented for each selection of a candidate node (e.g., survival metric is not determined and used).

As contemplated by the inventors, various algorithms may be used with varied priority levels. At a high level, for instance, a first algorithm using a first and second metric may be used when a service instance to be deployed is identified as a low-priority level, and a second algorithm using a second and third metric may be used when a service instance to be deployed is identified as a high-priority level. As one example, a high-priority allocation algorithm to use when assessing to which node to deploy a high-priority service instance might balance packing quality with eviction cost metrics, whereas a low-priority allocation algorithm to use when assessing to which node to deploy a low-priority service instance might be based solely on packing quality metrics. As another example, a high-priority allocation algorithm to use when assessing to which node to deploy a high-priority service instance might be based on packing quality metrics, whereas a low-priority allocation algorithm to use when assessing to which node to deploy a low-priority service instance might be based on a balance of packing quality and survival metrics. As yet another example, a high-priority allocation algorithm to use when assessing to which node to deploy a high-priority service instance might be based on packing quality balanced with evict cost metrics, whereas a low-priority allocation algorithm to use when assessing to which node to deploy a low-priority service instance might be based on a balance of packing quality and survival metrics. These are only examples of different allocation algorithms that can be used for service instances of different levels and are not meant to limit the scope of embodiments of the present invention.

Figure 6:
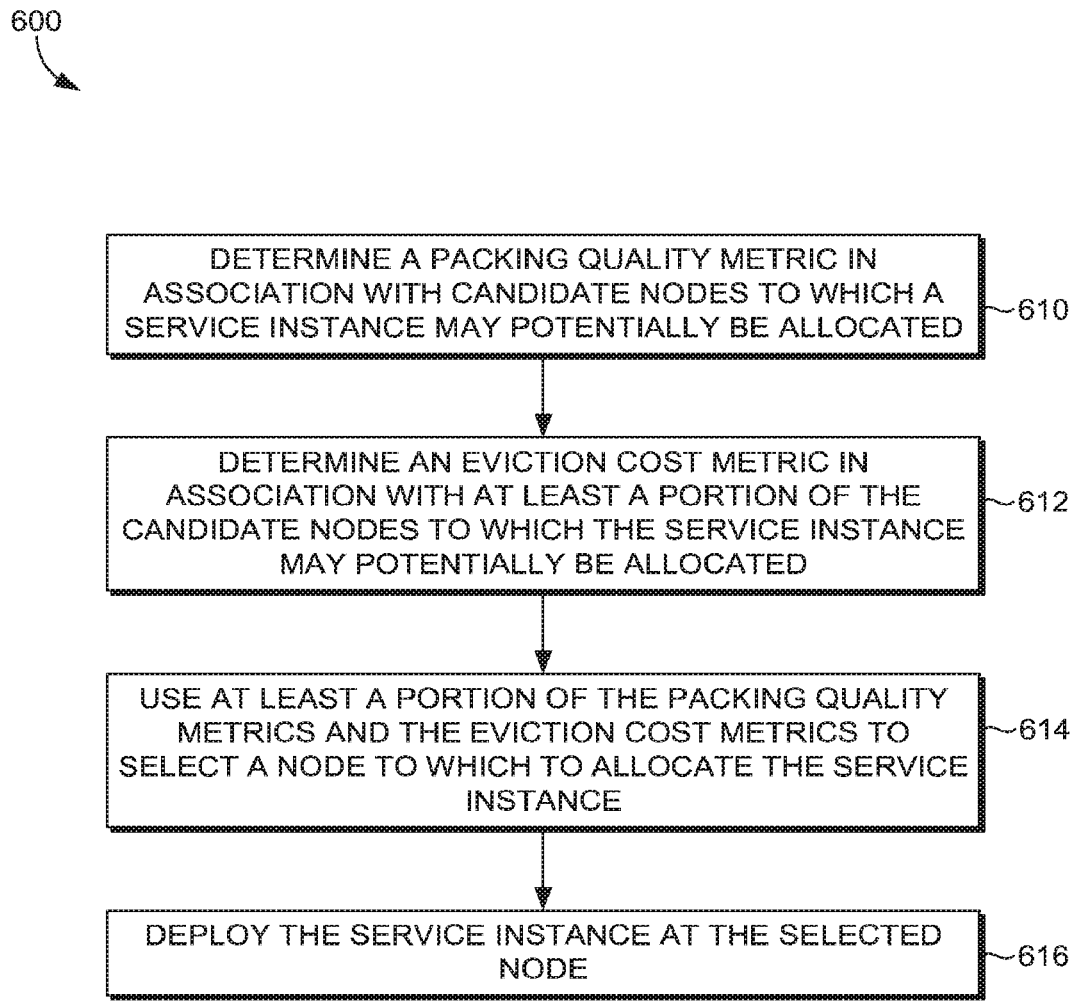
FIG. 6 is a flow diagram showing an exemplary first method for optimizing allocation of multi-priority service instances, in accordance with embodiments described herein.

Turning now to FIG. 6, a flow diagram is provided that illustrates a method 600 for optimizing multi-priority service instance allocation. Initially, at block 610, for a service instance to be deployed, a packing quality metric is determined in association with candidate nodes to which the service instance may potentially be allocated. At block 612, an eviction cost metric is determined in association with at least a portion of the candidate nodes to which the service instance may potentially be allocated. In some cases, an eviction cost is generated for each service instance-candidate node pair. In other cases, an eviction cost is generated for service instance-candidate node pairs that were selected based on assessment of the packing quality metrics (i.e., the packing quality metrics were used to reduce the set of potential node candidates). At block 614, at least a portion of the packing quality metrics and the eviction cost metrics are used to select a node to which to allocate the service instance. The service instance might be a low-priority service instance or a high-priority service instance. Subsequently, at block 616, the service instance is deployed at the selected node.

Figure 7:
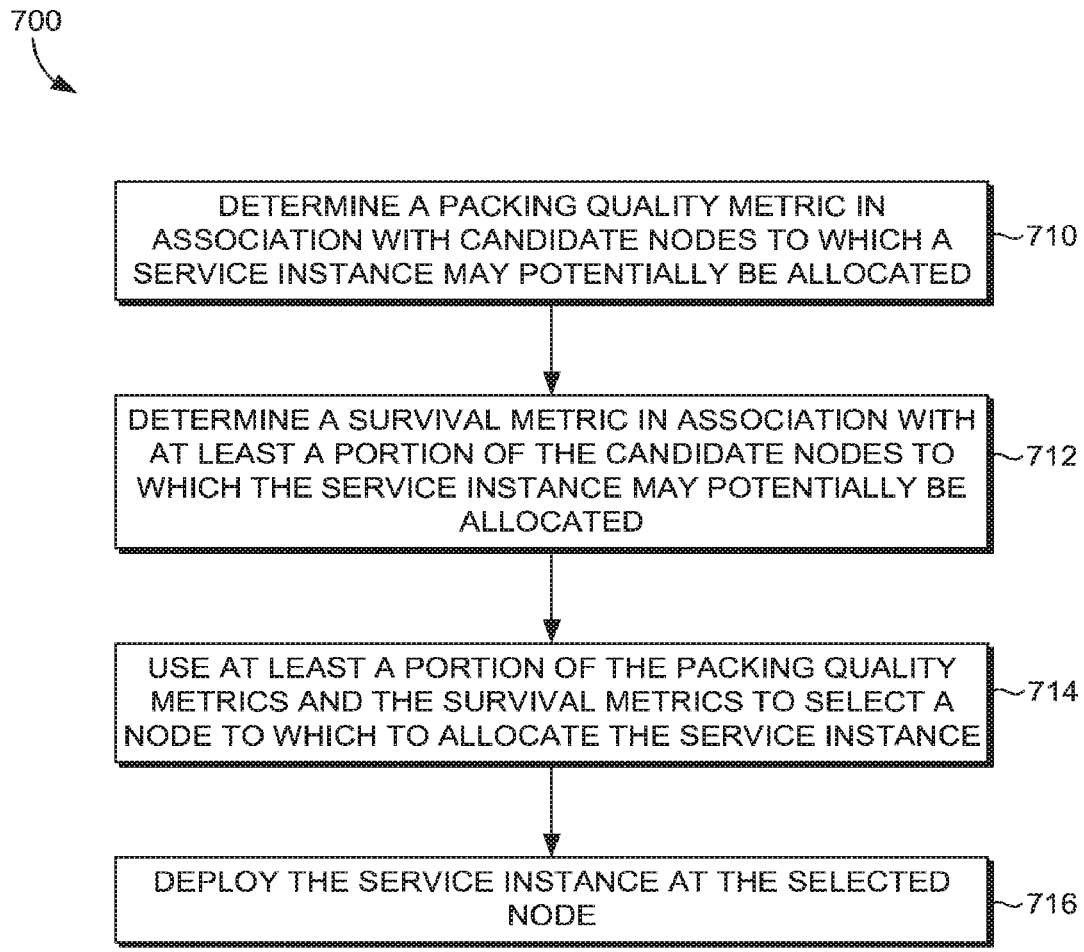
FIG. 7 is a flow diagram showing an exemplary second method for optimizing allocation of multi-priority service instances, in accordance with embodiments described herein.

Turning now to FIG. 7, a flow diagram is provided that illustrates a method 700 for optimizing multi-priority service instance allocation. Initially, at block 710, for a service instance to be deployed, a packing quality metric is determined in association with candidate nodes to which the service instance may potentially be allocated. At block 712, a survival metric is determined in association with at least a portion of the candidate nodes to which the service instance may potentially be allocated. In some cases, a survival metric is generated for each service instance-candidate node pair. In other cases, a survival metric is generated for service instance-candidate node pairs that were selected based on assessment of the packing quality metrics (i.e., the packing quality metrics were used to reduce the set of potential node candidates). At block 714, at least a portion of the packing quality metrics and the survival metrics are used to select a node to which to allocate the service instance. The service instance might be a low-priority service instance or a high-priority service instance. Subsequently, at block 716, the service instance is deployed at the selected node.

Figure 8:
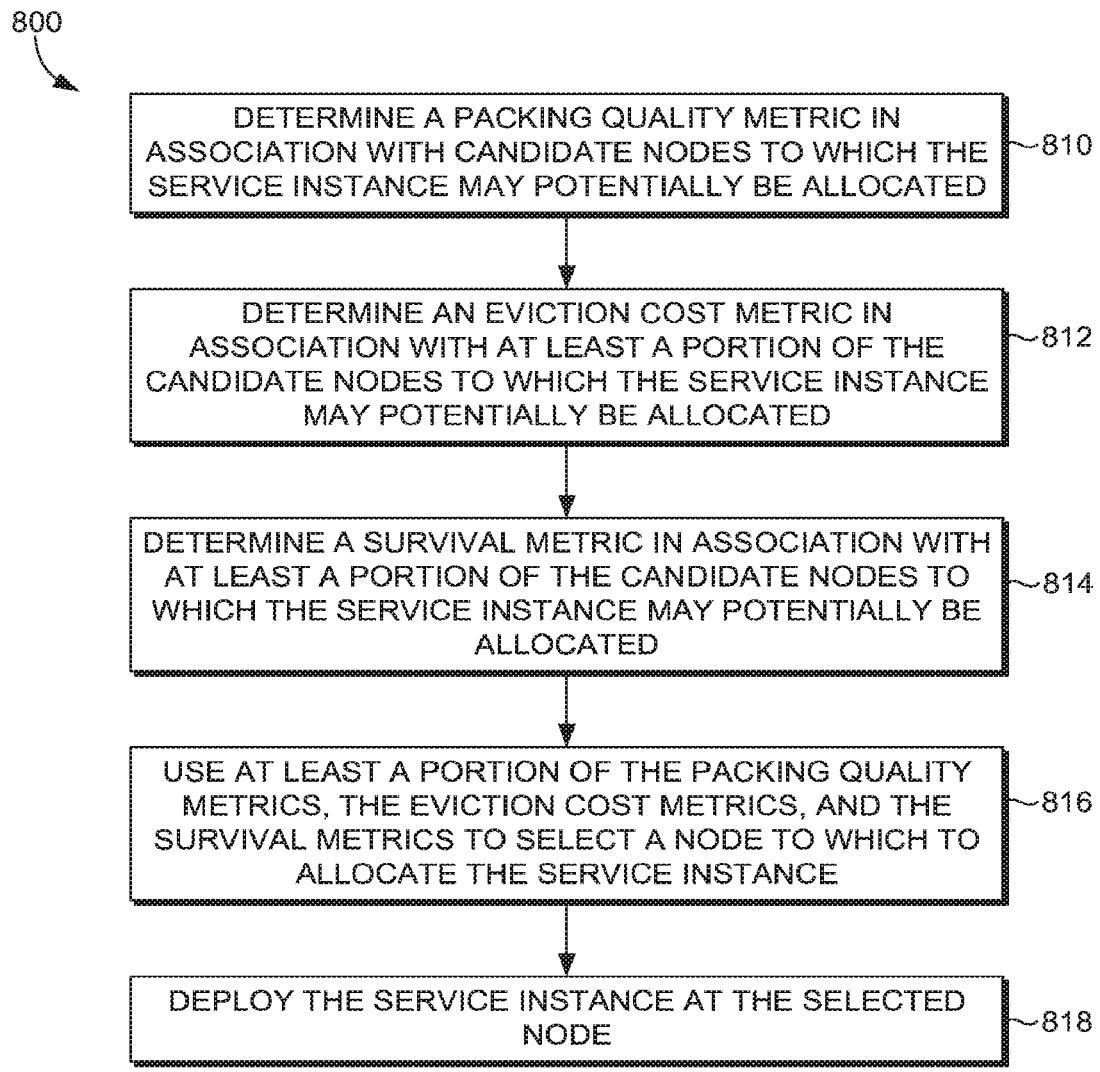
FIG. 8 is a flow diagram showing an exemplary third method for optimizing allocation of multi-priority service instances, in accordance with embodiments described herein.

With reference to FIG. 8, a flow diagram is provided that illustrates a method 800 for optimizing multi-priority service instance allocation. Initially, at block 810, for a service instance to be deployed, a packing quality metric is determined in association with candidate nodes to which the service instance may potentially be allocated. At block 812, an eviction cost metric is determined in association with at least a portion of the candidate nodes to which the service instance may potentially be allocated. In some cases, an eviction cost is generated for each service instance-candidate node pair. In other cases, an eviction cost is generated for service instance-candidate node pairs that were selected based on assessment of the packing quality metrics (i.e., the packing quality metrics were used to reduce the set of potential node candidates). At block 814, a survival metric is determined in association with at least a portion of the candidate nodes to which the service instance may potentially be allocated. In some cases, a survival metric is generated for each service instance-candidate node pair. In other cases, a survival metric is generated for service instance-candidate node pairs that were selected based on assessment of the packing quality metrics and/or eviction cost metrics (e.g., the packing quality metrics and/or eviction cost metrics were used to reduce the set of potential node candidates). At block 816, at least a portion of the packing quality metrics, the eviction cost metrics, and the survival metrics are used to select a node to which to allocate the service instance. The service instance might be a low-priority service instance or a high-priority service instance. At block 818, the service instance is deployed at the selected node.

Figure 9:
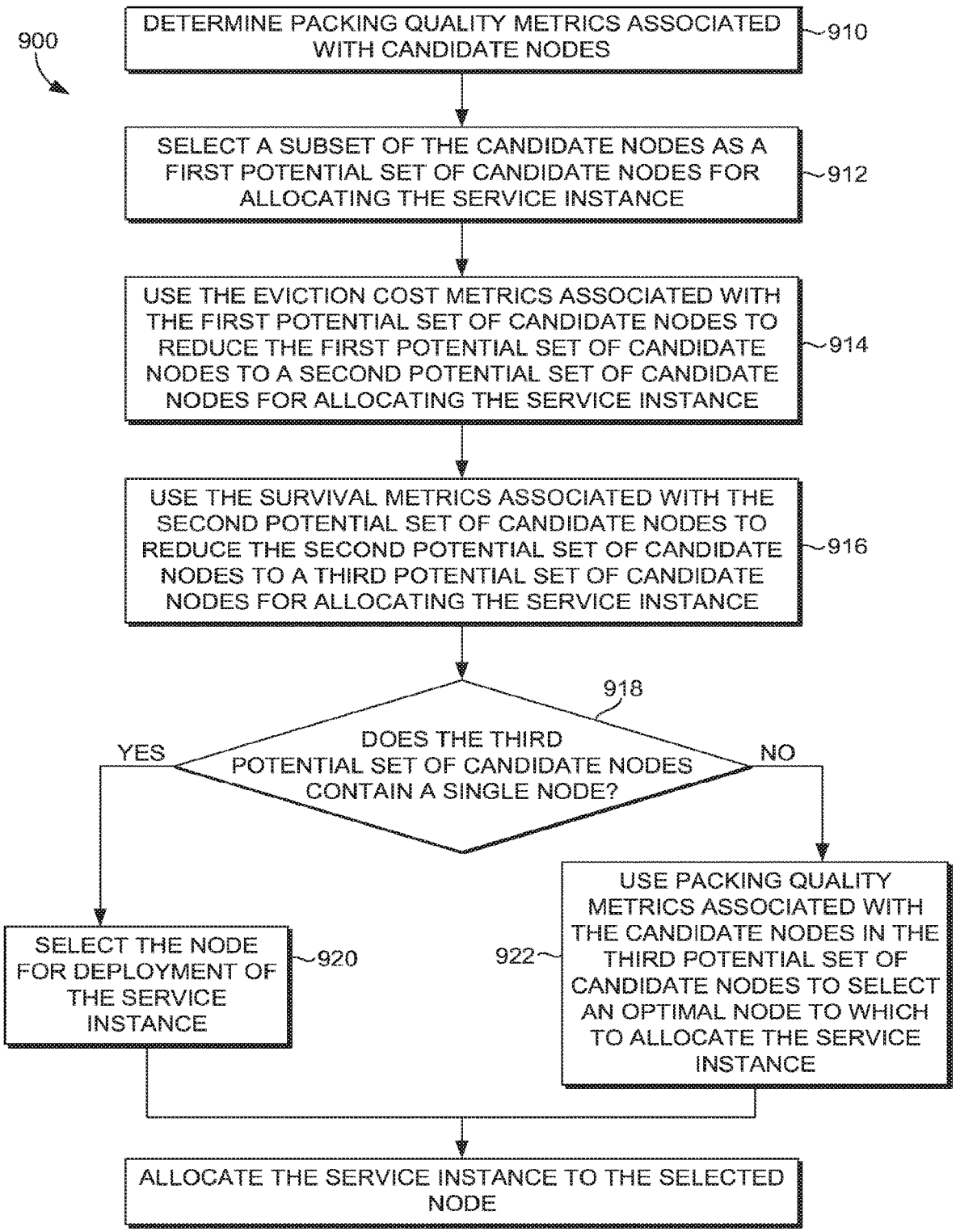
FIG. 9 is a flow diagram showing an exemplary fourth method for optimizing allocation of multi-priority service instances, in accordance with embodiments described herein.

With reference to FIG. 9, a flow diagram is provided that illustrates a method 900 for optimizing multi-priority service instance allocation. Initially, at block 910, for a service instance to be allocated, packing quality metrics associated with candidate nodes are determined. At block 912, a subset of the candidate nodes are selected as a first potential set of candidate nodes for allocating the service instance. In some embodiments, a threshold value may be used to select a portion of the best fitting nodes. At block 914, eviction cost metrics associated with the first potential set of candidate nodes are used to reduce the first potential set of candidate nodes to a second potential set of candidate nodes for allocating the service instance. In some embodiments, nodes associated with the least eviction costs may be selected. At block 916, survival metrics associated with the second potential set of candidate nodes are used to reduce the second potential set of candidate nodes to a third potential set of candidate nodes for allocating the service instance. In some cases, nodes associated with a longest survival time for a deployed service instance can be selected. At block 918, a determination is made as to whether the third potential set of candidate nodes contains a single node. If so, the node is selected for deployment of the service instance, as indicated at block 920. If not, at block 922, packing quality metrics associated with the candidate nodes in the third potential set of candidate nodes are used to select an optimal node to which to allocate the service instance. The service instance is allocated to the selected node, as indicated at block 924.

Figure 10:
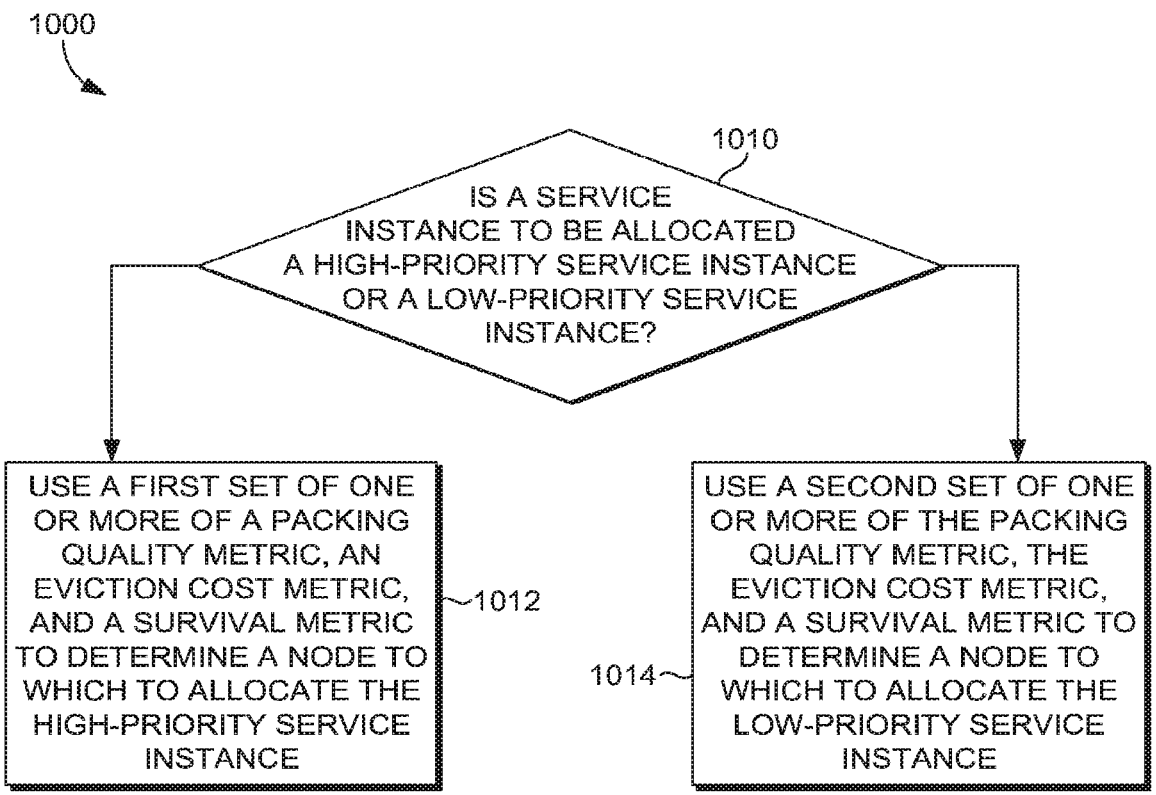
FIG. 10 is a flow diagram showing an exemplary fifth method for optimizing allocation of multi-priority service instances, in accordance with embodiments described herein.

Turning now to FIG. 10, a flow diagram is provided that illustrates a method 1000 for optimizing multi-priority service instance allocation. Initially, at block 1010, an identification of whether a service instance to be allocated is a high-priority service instance or a low-priority service instance. If it is determined that a service instance is a high-priority service instance, a first set of one or more of a packing quality metric, an eviction cost metric, and a survival metric is used to determine a node to which to allocate the high-priority service instance, as indicated at block 1012. On the other hand, if it is determined that a service instance is a low-priority service instance, a second set of one or more of the packing quality metric, the eviction cost metric, and a survival metric is used to determine a node to which to allocate the low-priority service instance, as indicated at block 1014.

Figure 11:
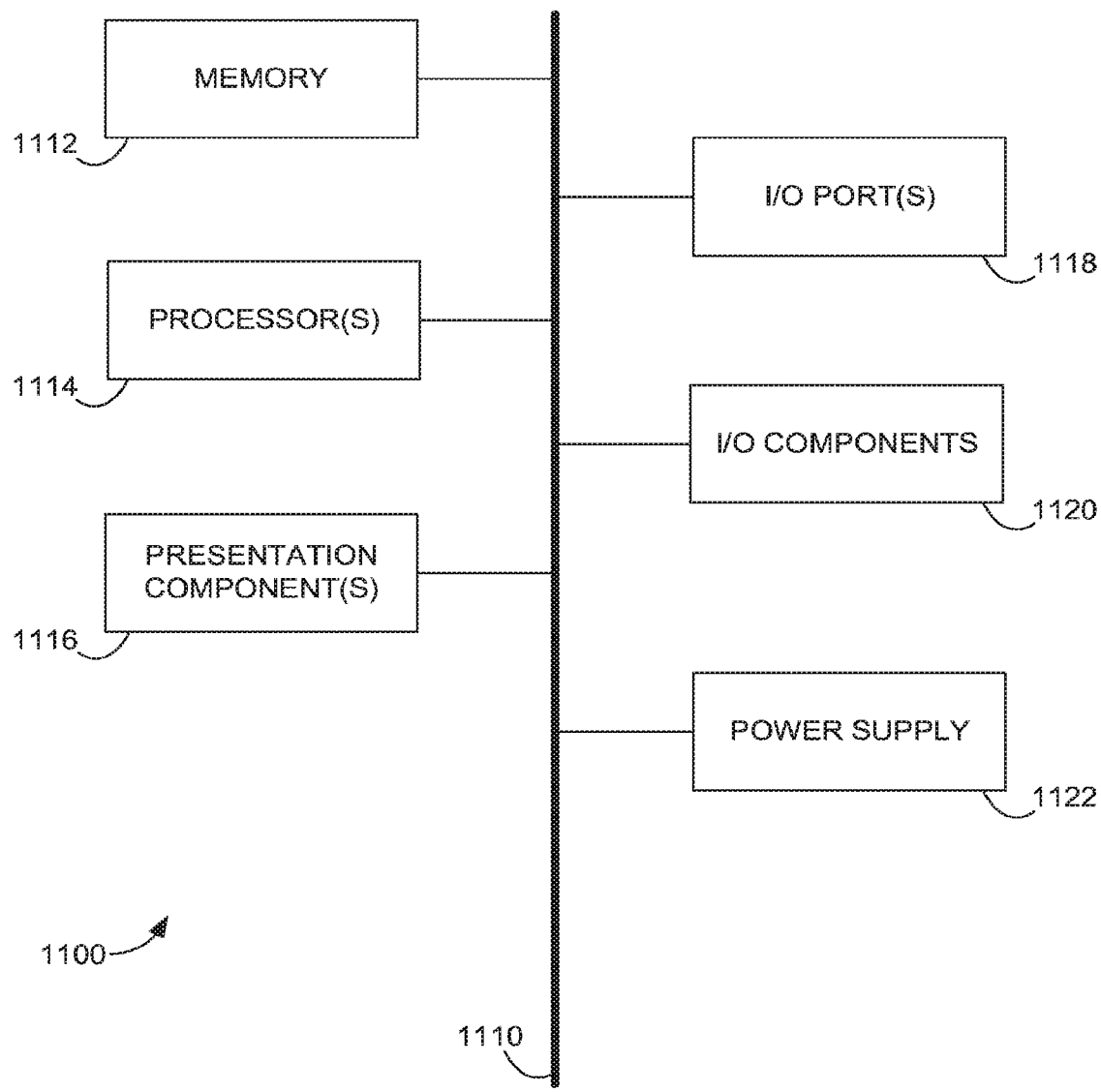
FIG. 11 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computing device. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments described herein are directed to optimizing allocation of multi-priority service instances. As can be understood, many different arrangements and scopes are included within variations of embodiments, some examples of which follow. In one embodiment, a system is configured for optimizing allocation of multi-priority service instances. The system includes an allocator component configured for identifying packing quality metrics associated with candidate nodes, each of the packing quality metrics indicating an extent to which a service instance to be allocated utilizes resources within a node. The allocator component also configured for selecting a first subset of nodes of the candidate nodes based on the packing quality metrics. The allocator component also configured for selecting a second subset of nodes of the candidate nodes based on eviction cost metrics associated with at least a first portion of the candidate nodes, each of the eviction cost metrics indicating cost to evict a service instance from a node such that another service instance can be allocated to that node. The allocator component also configured for selecting a third subset of one or more nodes of the candidate nodes based on survival metrics associated with at least a second portion of the candidate nodes, wherein a survival metric indicates an extent that the service instance will not be evicted or will survive if deployed to a corresponding node. The allocator component further configured for allocating the service instance to one node within the first subset of nodes, the second subset of nodes, or the third subset of one or more nodes in accordance with the packing quality, eviction cost, and survival trics.

In another aspect, a computer-implemented method for optimizing allocation of multi-priority service instances is provided. The method includes determining a packing quality metric associated with each candidate node to which a service instance could be allocated. The method also includes determining an eviction cost associated with at least a portion of the candidate nodes to which the service instance could be allocated, each of the eviction costs indicating a cost to evict a service instance from a corresponding node such that another service instance can be allocated to that node. The method also includes utilizing at least a portion of the packing quality metrics and the eviction costs to select a node from the candidate nodes to which to allocate the service instance.

In yet another aspect, one or more computer storage media having computer-executable instructions embodied thereon that, when executed, by one or more processors, causes the one or more processors to perform a method for optimizing allocation of multi-priority service instances is provided. The method includes identifying a packing quality metric associated with each candidate node to which a service instance could be allocated. The method also includes identifying a survival metric associated with at least a portion of the candidate nodes to which the service instance could be allocated, each of the survival metrics indicating an extent that the service instance will not be evicted or will survive if deployed to the corresponding node. The method also includes utilizing at least a portion of the packing quality metrics and the survival metrics to select a node from the candidate nodes to which to allocate the service instance.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for allocation of service instances, the system comprising:
   an allocator component configured for:
   identifying a first subset of nodes of candidate nodes based on a first quality metric associated with candidate nodes;
   identifying a second subset of nodes of the candidate nodes based on a second quality metric, wherein the second quality metric comprises at least one of an eviction cost metric associated with at least a first portion of the candidate nodes, each of the eviction cost metrics indicating cost to evict an existing service instance from a node such that another service instance can be allocated to that node and a survival metric that indicates an extent that the first service instance will not be evicted or will survive if deployed to a corresponding node; and
   allocating the first service instance to one node within the first subset of nodes and the second subset of nodes based on the first quality metric and the second quality metric.

2. The system of claim 1, further comprising determining if the existing service instance can be evicted from a node.

3. The system of claim 2, wherein determining if the existing service instance can be evicted from a node comprises identifying the existing service instance as having a lower priority than the first service instance.

4. The system of claim 1, wherein the extent that the first service instance will not be evicted quantifies the impact to the subsequent deployment of higher-priority instances.

5. The system of claim 1, wherein the first quality metric comprises a packing quality metric associated with candidate nodes, each of the packing quality metrics indicating an extent to which a service instance to be allocated utilizes resources within a node.

6. The system of claim 1, wherein the first quality metric and the second quality metrics are sequentially used to select the one node to which to allocate the first service instance.

7. The system of claim 1, wherein the identifying a second subset of nodes of the candidate nodes is based on a comparison of the second quality metric to a threshold.

8. The system of claim 5, wherein the packing quality metric is applied to high priority workloads.

9. The system of claim 1, wherein the first service instance is a new service instance.

10. A computer-implemented method for evaluating allocation of a service instance, the method comprising:
    determining a first quality metric associated with each candidate node to which a service instance could be allocated;
    determining an eviction cost associated with at least a portion of the candidate nodes to which the service instance could be allocated, each of the eviction costs indicating a cost to evict a service instance from a corresponding node such that another service instance can be allocated to that node; and
    utilizing at least a portion of the first quality metrics and the eviction costs to select a node from the candidate nodes to which to allocate the service instance.

11. The method of claim 10, wherein the first quality metric comprises a packing quality metric associated with candidate nodes, each of the packing quality metrics indicating an extent to which a service instance to be allocated utilizes resources within a node.

12. The method of claim 10, further comprising allocating the service instance to the selected node.

13. The method of claim 10, wherein each of the eviction cost metrics is based on the relative priority of an instance currently running on a node compared to the priority of an instance to be allocated to the node.

14. The method of claim 10, wherein the service instance is a new service instance.

15. One or more computer storage media having computer-executable instructions embodied thereon that, when executed, by one or more processors, causes the one or more processors to perform a method for evaluating allocation of a service instance, the method comprising:

determining a first quality metric associated with each candidate node to which a service instance could be allocated;

determining a survival metric associated with at least a portion of the candidate nodes to which the service instance could be allocated, each of the survival metrics indicating an extent that the service instance will not be evicted or will survive if deployed to the corresponding node; and utilizing at least a portion of the first quality metrics and the survival metrics to select a node from the candidate nodes to which to allocate the service instance.

16. The method of claim 15, wherein the first quality metric comprises a packing quality metric associated with candidate nodes, each of the packing quality metrics indicating an extent to which a service instance to be allocated utilizes resources within a node.

17. The method of claim 15, further comprising allocating the service instance to the selected node.

18. The media of claim 15, wherein the survival metric is determined based on an independent danger probability for a node and an instance type pair.

19. The media of claim 18, wherein the survival metric comprises a sum of terms, in which each term comprises an independent danger probability for a type of service instance.

20. The media of claim 15, wherein the service instance is a new service instance.

\* \* \* \* \*